US012225342B2

(12) United States Patent
Hanayama et al.

(10) Patent No.: US 12,225,342 B2
(45) Date of Patent: Feb. 11, 2025

(54) COAXIAL SPEAKER HORN, AND COAXIAL SPEAKER

(71) Applicant: Yamaha Corporation, Hamamatsu (JP)

(72) Inventors: Katsutoki Hanayama, Hamamatsu (JP); Hiroyuki Shiojima, Hamamatsu (JP); Bahari Satriyo, East Java (ID)

(73) Assignee: Yamaha Corporation, Hamamatsu (JP)

( * ) Notice: Subject to any disclaimer, the term of this patent is extended or adjusted under 35 U.S.C. 154(b) by 105 days.

(21) Appl. No.: 17/971,731

(22) Filed: Oct. 24, 2022

(65) Prior Publication Data

US 2023/0128617 A1 Apr. 27, 2023

(30) Foreign Application Priority Data

Oct. 26, 2021 (JP) ................................ 2021-174554

(51) Int. Cl.
*H04R 1/24* (2006.01)
*H04R 1/28* (2006.01)
*H04R 1/30* (2006.01)

(52) U.S. Cl.
CPC ............ *H04R 1/24* (2013.01); *H04R 1/2803* (2013.01); *H04R 1/30* (2013.01)

(58) Field of Classification Search
CPC .......... H04R 1/24; H04R 1/2803; H04R 1/30
See application file for complete search history.

(56) References Cited

U.S. PATENT DOCUMENTS 8,130,994 B2 * 3/2012 Button ................ H04R 1/2853 381/337
2009/0310808 A1 12/2009 Button
2010/0124340 A1 * 5/2010 Knieschewski ........ H04R 1/025 381/87

FOREIGN PATENT DOCUMENTS

JP S55-72384 U 5/1980
JP 2007-274361 A 10/2007

OTHER PUBLICATIONS

Office Action issued in Japanese Application No. 2021-174554 dated Dec. 24, 2024, (14 pages), w/English Translation.

* cited by examiner

*Primary Examiner* — Sunita Joshi
(74) *Attorney, Agent, or Firm* — Crowell & Moring LLP

(57) ABSTRACT

A coaxial speaker horn constitutes a coaxial speaker together with a tweeter and a woofer. The coaxial speaker horn includes a plurality of through holes arranged around an entire circumference of the horn.

6 Claims, 4 Drawing Sheets

COAXIAL SPEAKER HORN, AND COAXIAL SPEAKER

CROSS-REFERENCE TO RELATED APPLICATIONS

The present application claims priority to Japanese Patent Application No. 2021-174554, filed Oct. 26, 2021, the content of which is incorporated herein by reference.

BACKGROUND

The present disclosure relates to a coaxial speaker horn and a coaxial speaker. U.S. Pat. No. 8,130,994 (hereinafter referred to as Patent Document 1) discloses a coaxial speaker in which a tweeter that outputs high range sounds and a woofer that outputs low-mid range sounds are coaxially arranged. In the coaxial speaker of Patent Document 1, a tweeter is arranged on the front side of a woofer (on the side where sound is output from the woofer) in the axial direction, and a horn (waveguide) is attached to the tweeter. The horn is formed in a cylindrical shape (conical shape), the diameter of which increases gradually with approach from the tweeter to the front side of the woofer in the axial direction. The horn plays a role of increasing the sound pressure output from the tweeter and controlling the directivity of the sound output from the tweeter.

In the coaxial speaker of Patent Document 1, a plurality of through holes are formed in the horn so that the sound of the woofer propagates to the front side of the horn. Each through hole is formed in a slit shape extending in radial directions of the horn when viewed from the axial direction. The plurality of slit-shaped through holes are arranged at intervals around the circumferential direction of the horn.

In the coaxial speaker of Patent Document 1 having such a horn structure, the slit-shaped through-holes have a predetermined opening area, and thereby the horn functions as a low-pass filter for the woofer. Moreover, the horn (especially a region of the horn where the slit-shaped through holes are not formed) also functions as a compression chamber for the woofer.

SUMMARY

In a speaker system including a tweeter and a woofer, such as a coaxial speaker, in general, the characteristics of the speaker system are adjusted by means of a passive crossover network in order to suppress the disturbance in the characteristics caused by the combination of the tweeter and the woofer. However, in the coaxial speaker of Patent Document 1, in which the horn functions as a low-pass filter and as a compression chamber, the frequency characteristics of the woofer differ significantly between the woofer alone and the tweeter and horn combined. Therefore, there is a problem that it is difficult to adjust the characteristics of the coaxial speaker by means of a passive crossover network.

The present disclosure takes into consideration the above circumstances. An object of the present disclosure is to provide a coaxial speaker horn capable of easily adjusting the characteristics of a coaxial speaker and a coaxial speaker including the coaxial speaker horn.

A first aspect of the present disclosure is a coaxial speaker horn for constituting a coaxial speaker together with a tweeter and a woofer. The coaxial speaker horn includes a plurality of point-like through holes arranged around an entire circumference of the horn.

A second aspect of the present disclosure is a coaxial speaker including: a horn including a plurality of point-like through holes arranged around an entire circumference of the horn; a tweeter attached to a central portion of the horn when viewed from an axial direction of the horn; and a woofer arranged coaxially with the tweeter, the woofer being arranged on a rear side of the tweeter.

According to the present disclosure, the characteristics of a coaxial speaker can be adjusted easily.

DETAILED DESCRIPTION

Hereinafter, embodiments of the present disclosure will be described, with reference to FIG. 1 to FIG. 4.

Figure 1:
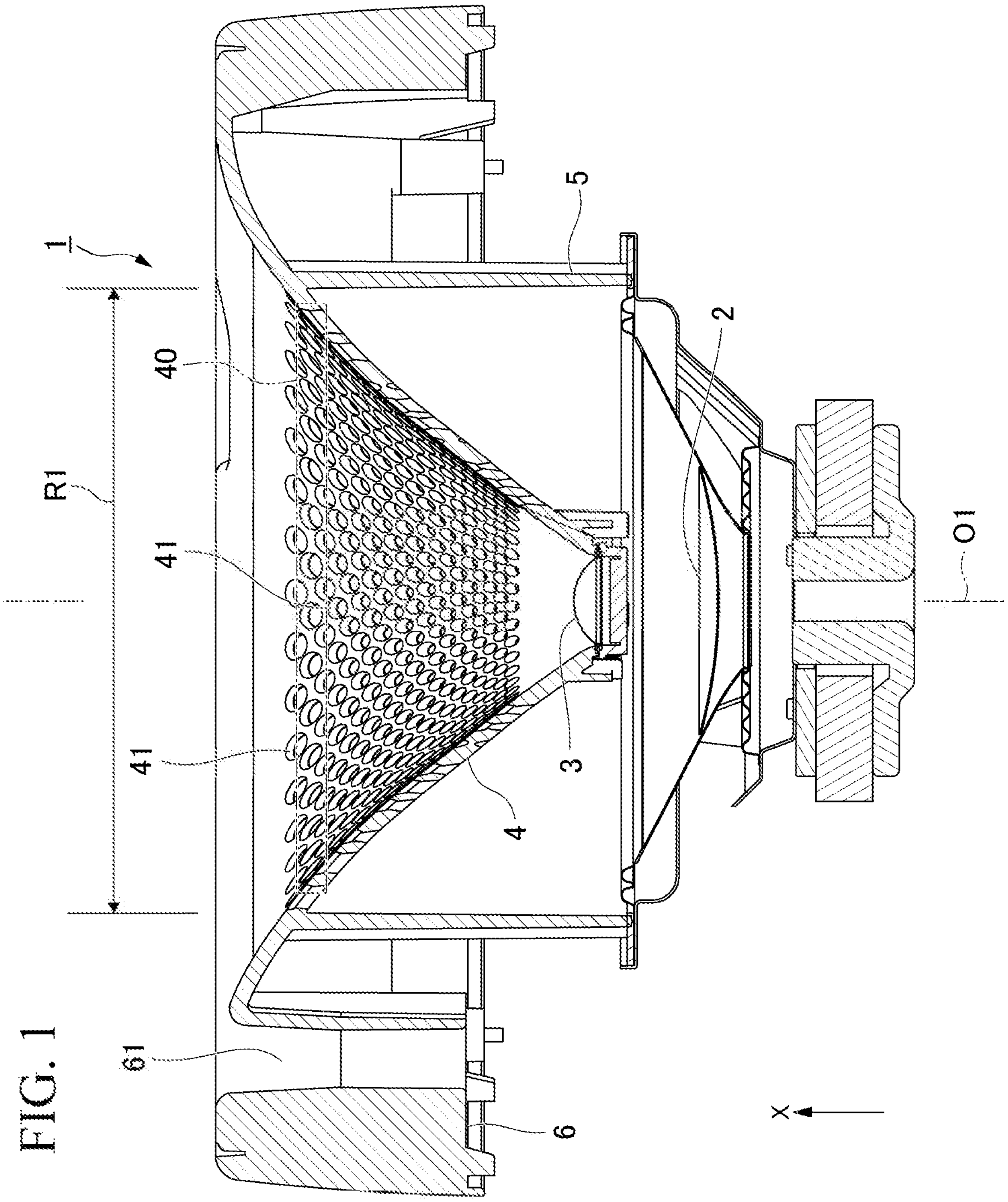
FIG. 1 is a cross-sectional view showing a coaxial speaker, and is a cross-sectional view corresponding to the line A-A of FIG. 3.
Figure 2:
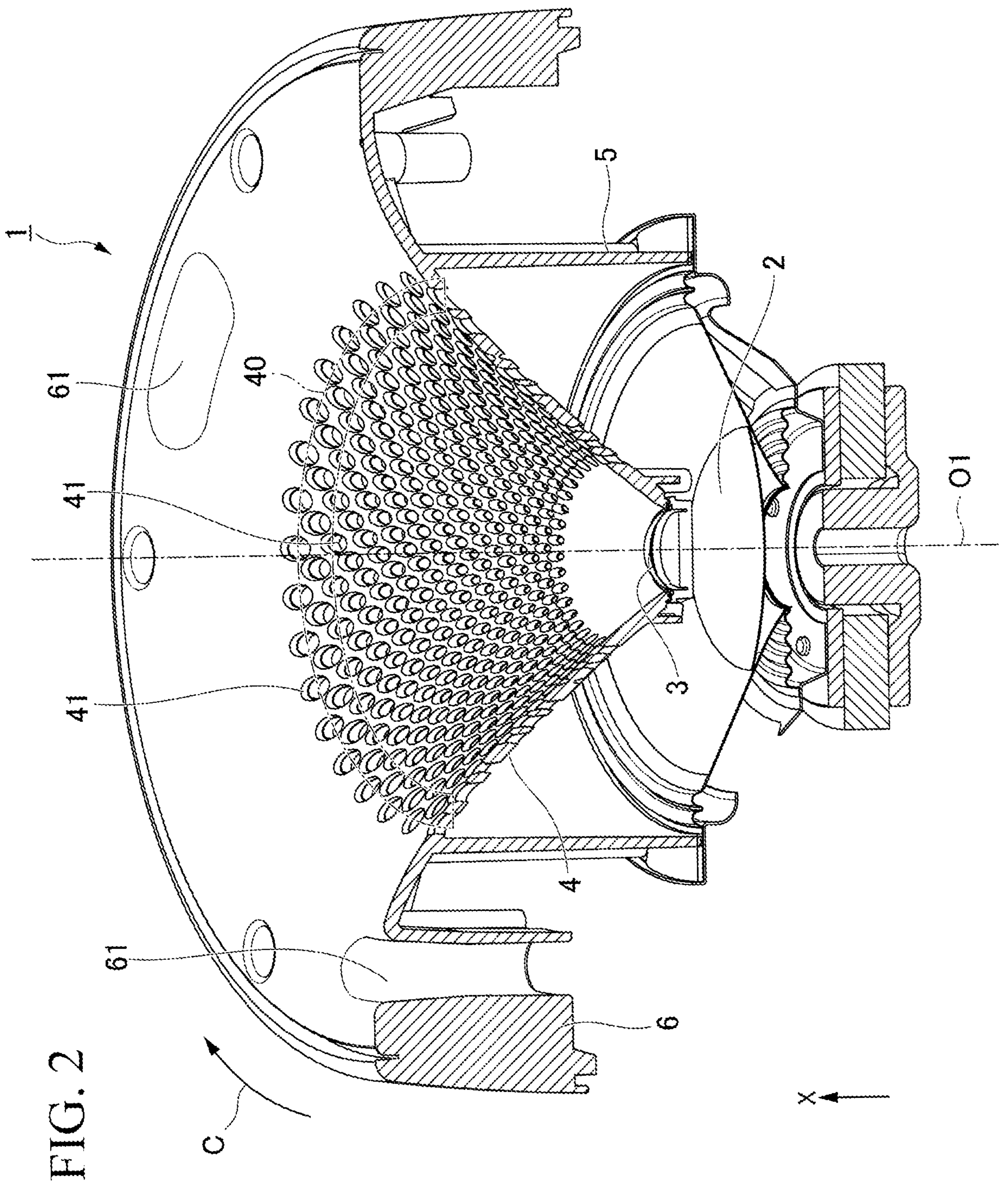
FIG. 2 is a cross-sectional perspective view showing the coaxial speaker of FIG. 1, and is a cross-sectional view corresponding to the line A-A of FIG. 3.

As shown in FIG. 1 and FIG. 2, a coaxial speaker 1 includes a woofer 2, a tweeter 3, and a horn 4 (coaxial speaker horn). The woofer 2 vibrates to thereby output mainly low-mid range sounds. The tweeter 3 vibrates to thereby output mainly high range sounds. The woofer 2 and tweeter 3 are coaxially arranged having therebetween a clearance in the vibration direction thereof.

Figure 3:
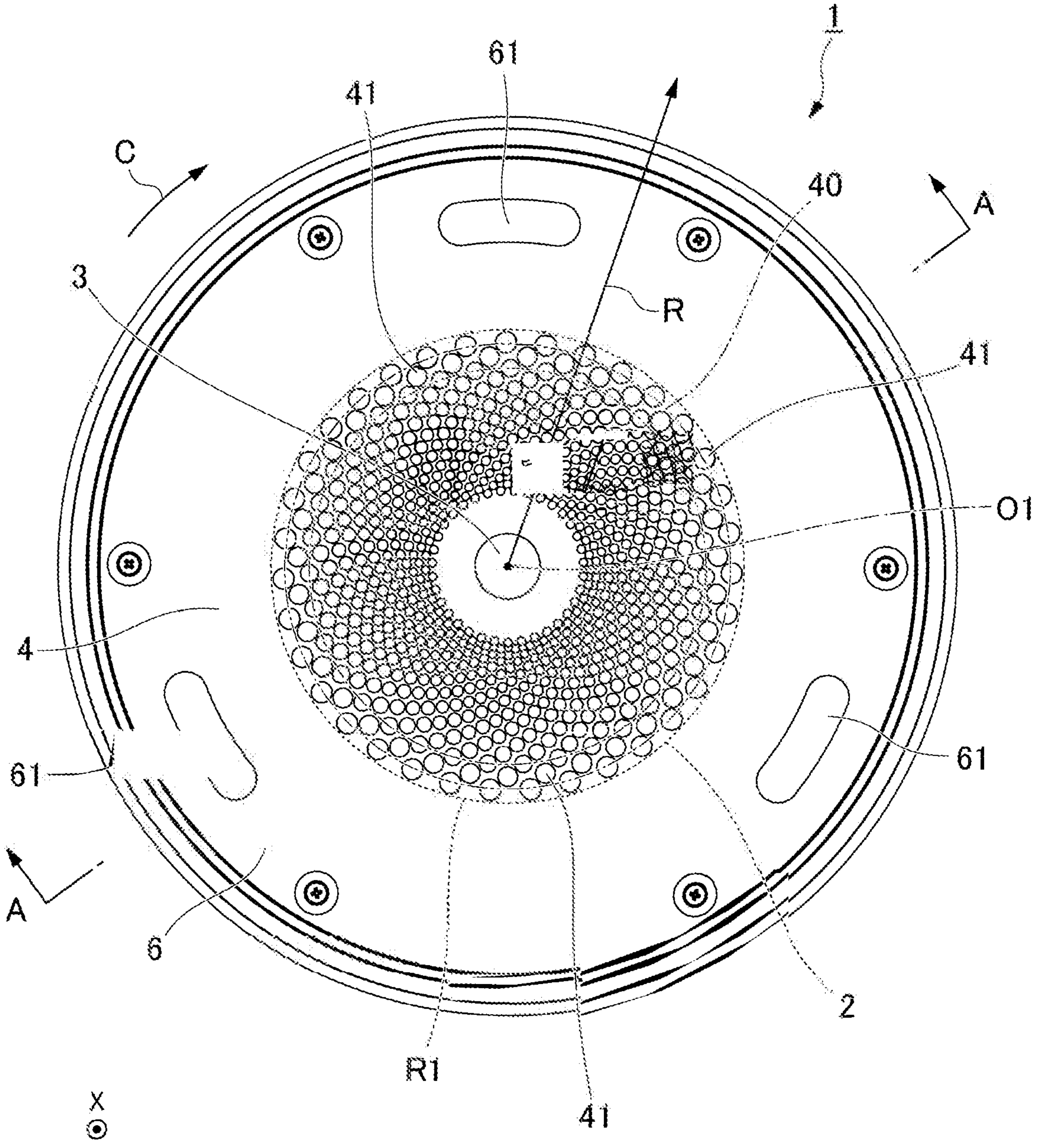
FIG. 3 is a front view of the coaxial speaker of FIG. 1.

In FIG. 1 to FIG. 3, the vibration direction of the woofer 2 and the tweeter 3 is indicated by the X-axis direction. In FIG. 1 to FIG. 3, the direction indicated by the arrow is the X-axis positive direction, and the opposite direction is the X-axis negative direction. The woofer 2 and the tweeter 3 being coaxially arranged means that the woofer 2 and the tweeter 3 are arranged so that the center axes of the woofer 2 and the tweeter 3 extending in the X-axis direction (the axis denoted by reference symbol O1 in FIG. 1 to FIG. 3) completely or substantially align with each other.

The woofer 2 is configured such that the sound output from the woofer 2 mainly propagates toward one side in the vibration direction of the woofer 2 (toward the side that is indicated by the X-axis positive direction in FIG. 1 to FIG. 3). The sound output from the woofer 2 also propagates toward the other side in the vibration direction (toward the side that is indicated by the X-axis negative direction in FIG. 1 to FIG. 3).

In the following description, the side mainly toward which sounds are output from the woofer 2 (one side in the vibration direction) may be referred to as front side in some cases. Moreover, the side opposite to the front side may be referred to as rear side in some cases. In FIG. 1 and FIG. 2, the upper side (or up-side) corresponds to the "front side" and is indicated by the X-axis positive direction. Also, in FIG. 1 and FIG. 2, the lower side (or down-side) corresponds to the "rear side" and is indicated by the X-axis negative direction.

As shown in FIG. 3, the woofer 2 is formed in a circular shape when viewed from the front side.

As shown in FIG. 1 and FIG. 2, the tweeter 3 is arranged coaxially with the woofer 2 with a clearance on the front side of the woofer 2.

As shown in FIG. 3, the tweeter 3 is formed in a circular shape similar to that of the woofer 2 when viewed from the front side. The size (diameter dimension) of the tweeter 3 as viewed from the front side is sufficiently smaller than the size (diameter dimension) of the woofer 2.

As shown in FIG. 1 and FIG. 2, the horn 4 is attached to the tweeter 3. The horn 4 increases the sound pressure output from the tweeter 3 and controls the directivity of the sound output from the tweeter 3. Specifically, the horn 4 actively directs the sound output from the tweeter 3 to the front side of the horn 4.

The horn 4 is formed in a cylindrical shape, the diameter of which increases gradually with approach to the one side (X-axis positive direction) in the axial direction. The horn 4 is arranged so that the axial direction thereof (X-axis direction) aligns with the vibration direction of the tweeter 3 (vertical direction in FIG. 1 and FIG. 2), and that the larger diameter side is oriented forward in the axial direction. The tweeter 3 is attached to a first end part (rear end) of the horn 4 having a smaller diameter, that is, a central portion of the horn 4. As shown in FIG. 3, the horn 4 is formed in a circular shape similar to that of the woofer 2 and the tweeter 3 when viewed from the front side. The size (diameter dimension) of the horn 4 as viewed from the front side is greater than the size (diameter dimension) of the woofer 2.

The woofer 2, the tweeter 3, and the horn 4, which are of circular shape as viewed from the front side, are arranged so that their center axes (the axis denoted by reference symbol O1) are completely or substantially aligned.

As shown in FIG. 1 and FIG. 2, the horn (horn body) 4 has a plurality of through holes 41. Each through hole 41 penetrates through the horn 4 in the axial direction thereof. Each through hole 41 penetrating through the horn 4 in the axial direction is not limited to the direction of the through hole 41 being completely aligned with the axial direction of the horn 4, but also includes, for example, the direction of the through hole 41 being slightly pitched from the axial direction of the horn 4. The through holes 41 of the horn 4 have the role of allowing the sound output from the woofer 2 arranged on the rear side of the tweeter 3 and the horn 4 to pass therethrough and propagate to the front side of the horn 4.

Each through hole 41 of the horn 4 is formed in a point shape when viewed from the front side (in the axial direction) as shown in FIG. 3. In the present embodiment, each point-like through hole 41 is of a circular shape when viewed from the front side. The shape of each point-like through hole 41 may be, for example, a regular polygonal shape such as a square shape, a circular shape, an elliptical shape similar to a regular polygonal shape, or a slightly flattened polygonal shape (a shape with an aspect ratio close to 1).

The plurality of through holes 41 are arranged around the entire circumference of the horn 4. The plurality of through holes 41 being arranged around the entire circumference of the horn 4 means that the point-like through holes 41 are lined up in a ring shape at equal intervals over the entire range around the circumferential direction of the horn 4 (the direction denoted by reference symbol C in FIG. 2 and FIG. 3). The shape of a ring unit 40, in which the point-like through holes 41 are arranged in a ring shape, may correspond to the shape of the woofer 2 as viewed from the front side, and is a circular shape in the present embodiment. The interval between the point-like through holes 41 around the circumferential direction is preferably small enough so that the horn 4 does not function as a low-pass filter or as a compression chamber for the woofer 2, for example.

The plurality of through holes 41 are also arranged in the radial direction of the horn 4 (as denoted by reference symbol R in FIG. 3, the direction from the position of the axis denoted by reference symbol O1 at the center of the horn 4 toward the outer side of the horn 4) when the horn 4 is viewed from the front side (in the axial direction of the horn 4). Specifically, a plurality of the ring units 40, in each of which the point-like through holes 41 are arranged in the ring shape, are arranged concentrically (in the radial direction of the horn 4) centered on the axis of the horn 4 (the axis denoted by reference symbol O1 in FIG. 1 to FIG. 3). The arrangement of the plurality of through holes 41 being lined up in the radial direction of the horn 4 is not limited to arranging the plurality of through holes 41 strictly on a straight line extending in the radial direction of the horn 4 from the axis of the horn 4, but also includes arranging them in positions slightly offset around the circumferential direction from the straight line. That is to say, the through holes 41 adjacent to each other in the radial direction of the horn 4 may be offset from each other around the circumferential direction of the horn 4. The interval between the point-like through holes 40 in the radial direction (interval between the ring units 40) is preferably small enough so that the horn 4 does not function as a low-pass filter or as a compression chamber for the woofer 2, for example.

In present embodiment, the plurality of through holes 41 are arranged in a Fibonacci sequence spiral pattern. The plurality of through holes 41 may be arranged radially around the axis of the horn 4, for example.

In the present embodiment, the opening area of the through holes 41 that are located on the radially inner side of the horn 4 is smaller than the opening area of the through holes 41 that are located on the radially outer side of the horn 4. That is to say, the opening area of the through holes 41 increases with approach from the inner side to the outer side of the horn 4 in the radial direction. The opening area of the through holes 41 is an area when viewed from the front side (in the axial direction of the horn 4) as shown in FIG. 3.

The upper limit value of the opening area of each of the through holes 41 is set so that the horn 4 maintains the function thereof to increase the sound pressure of the sound at a predetermined frequency (high range sound) output from the tweeter 3. This is because if the opening area of each through hole 41 is excessively large, the function of the horn 4 (the function to increase the sound pressure of the sound at a predetermined frequency output from the tweeter 3) becomes impaired.

The lower limit value of the opening area of each of the through holes 41 is set so that the sound at a predetermined frequency (low-mid range sound) output from the woofer 2 travels through the through hole 41 to be propagated to the front side of the horn 4.

The range of the opening area of each through hole 41 may be set so that the diameter of the through hole 41, which is of a circular shape as viewed from the front side, is 2.5 mm or more and 7.5 mm or less, for example.

The total opening area of the plurality of through holes 41 formed in the horn 4 may be 35% or more of the total area of the horn 4 as viewed from the front side (the total area of the horn 4). Moreover, the total opening area of the through holes 41 may be 60% or less of the total area of the horn 4.

The plurality of through holes 41 are formed only in a region of the horn 4 that overlaps the woofer 2 as viewed from the front side as shown in FIG. 3. That is to say, the through holes 41 of the horn 4 are not formed in regions of the horn 4 located outside the woofer 2 in the radial direction.

In the present embodiment, the plurality of through holes 41 are formed in the entire region of the horn 4 that overlaps the woofer 2 (the region denoted by reference symbol R1 in FIG. 1 and FIG. 3). Therefore, the shape of the entire plurality of through holes 41 viewed from the front side is formed in a shape that corresponds to the woofer 2 (a circular shape in the present embodiment).

As shown in FIG. 1 and FIG. 2, the coaxial speaker 1 of the present embodiment further includes a woofer cover 5 that partitions the space between the woofer 2 and the horn 4 arranged in the axial direction of the horn 4, from the external space. The woofer cover 5 is formed in a cylindrical shape that extends forward from the woofer 2 to the horn 4. Although not shown in the drawings, the shape of the woofer cover 5 as viewed from the front side (in the axial direction of the horn 4) is formed in a shape that corresponds to the woofer 2. The shape of the woofer cover 5 corresponding to the woofer 2 as viewed from the front side is a shape corresponding to the outer circumference of the woofer 2 (a shape that substantially matches the outer circumference of the woofer 2), and corresponds to the outer circumference circle of the woofer 2 in the present embodiment. In the present embodiment, the woofer cover 5 is integrally formed with the horn 4. The plurality of through holes 41 formed in the horn 4 are located on the inner side of the woofer cover 5 in the radial direction of the horn 4.

The space between the woofer 2 and the horn 4 is surrounded by the woofer cover 5, so that the sound output from the woofer 2 to the front side can be efficiently propagated to the front side of the horn 4 through the through holes 41 of the horn 4.

The coaxial speaker 1 of the present embodiment further has a casing constituent part 6 that constitutes a part of a casing covering the space on the rear side of the woofer 2, the tweeter 3, and the horn 4. The casing constituent part 6 surrounds a second end part of the horn 4 (the front end of the horn 4 in FIG. 1 and FIG. 2) having a larger diameter, and is formed in a cylindrical shape extending from the second end part of the horn 4 to the rear side of the horn 4.

The casing constituent part 6 has a bass reflex port 61. The bass reflex port 61 is a hole for propagating the sound that is output from the woofer 2 to the rear side, to the outside of the casing.

In the coaxial speaker 1 of the present embodiment, the sound (particularly low-mid range sound) output from the woofer 2 to the front side propagates efficiently to the front side of the horn 4 through the through holes 41 of the horn 4. Moreover, the horn 4 increases the sound pressure of the sound output from the tweeter 3 and controls the directivity of this sound. As a result, sounds (low-mid range sounds and high range sounds) output from the coaxial speaker 1 can reach farther. Such a coaxial speaker 1 can be effectively used, for example, as a ceiling-hanging type speaker that is suspended from a high ceiling and emits sound from the ceiling toward the floor.

As described above, in the horn 4 (coaxial speaker horn) and the coaxial speaker 1 of the present embodiment, the horn 4 has the plurality of point-like through holes 41 arranged around an entire circumference of the horn 4. With this shape, the horn 4 is unlikely to function as a low-pass filter or as a compression chamber of the woofer 2. Also, it is possible to suppress or prevent the frequency characteristics of the woofer 2 incorporated in the coaxial speaker 1 from changing from the frequency characteristics of the woofer 2 alone. As a result, it is easy to adjust the characteristics of the coaxial speaker 1 by means of a passive crossover network.

Moreover, the horn 4 has the plurality of point-like through holes 41 arranged around the entire circumference of the horn 4, so that the horn 4 functions as a horn that increases the sound pressure of the sound of a predetermined frequency output from the tweeter 3. In other words, it is possible to suppress the function of the horn 4 from getting impaired by the formation of the through holes 41. That is to say, the sound pressure of the tweeter 3 can be increased also in the region of the horn 4 where the through holes 41 are formed.

Moreover, in the horn 4 and the coaxial speaker 1 of the present embodiment, the total opening area of the plurality of through holes 41 when viewed in the axial direction of the horn 4 is 35% or more of the entire area of the horn 4. As a result, it is possible to further suppress or prevent the frequency characteristics of the woofer 2 incorporated in the coaxial speaker 1 from changing from the frequency characteristics of the woofer 2 alone. As a result, it becomes even easier to adjust the characteristics of the coaxial speaker 1 by means of a passive crossover network.

Moreover, in the horn 4 and the coaxial speaker 1 of the present embodiment, the total opening area of the plurality of through holes 41 when viewed in the axial direction of the horn 4 is 60% or less of the entire area of the horn 4. As a result, it is possible to even more effectively suppress the function of the horn 4 (the function of increasing the sound pressure of the sound of a predetermined frequency output from the tweeter 3) from becoming impaired. In other words, the sound pressure of the tweeter 3 can be increased also in the region of the horn 4 where the through holes 41 are formed.

Furthermore, in the horn 4 and the coaxial speaker 1 of the present embodiment, the upper limit value of the opening area of each of the through holes 41 is set so that the horn 4 maintains the function thereof to increase the sound pressure of the sound at a predetermined frequency output from the tweeter 3. By setting the upper limit value of the opening area of each through hole 41 in this manner, it is possible to more effectively suppress the above "function of the horn 4" from becoming impaired.

As described above, with the horn 4 and the coaxial speaker 1 of the present embodiment, it is possible to easily adjust the characteristics of the coaxial speaker 1, and to suppress the "function of the horn 4" from becoming impaired.

Moreover, in the horn 4 and the coaxial speaker 1 of the present embodiment, the opening area of the through holes 41 that are located on the radially inner side of the horn 4 is smaller than the opening area of the through holes 41 that are located on the radially outer side of the horn 4. For this reason, even if the number of through holes 41 to be arranged around the circumferential direction of the horn 4 is equal in both a first ring-shaped region located on the radially inner side of the horn 4 and a second ring-shaped region located on the radially outer side of the horn 4, it is still possible to suppress or prevent the ratio of the opening area of the through holes 41 to the area of the horn 4 from being different between the first ring-shaped region and the second ring-shaped region. That is to say, the ratio of the opening area of the through holes 41 to the area of the horn 4 can be made uniform.

Moreover, in the horn 4 and the coaxial speaker 1 of the present embodiment, the plurality of through holes 41 are formed only in the region of the horn 4 that overlaps the woofer 2 as viewed from the axial direction of the horn 4. As a result, the sound output from the woofer 2 to the front side can be highly efficiently propagated to the front side of the horn 4 through the through holes 41 of the horn 4.

Hereinafter, with reference to FIG. 4, it will be described that the frequency characteristics of the woofer 2 incorporated in the coaxial speaker 1 can be approximated to the frequency characteristics of the woofer 2 alone, in the coaxial speaker 1 of the present embodiment.

Figure 4:
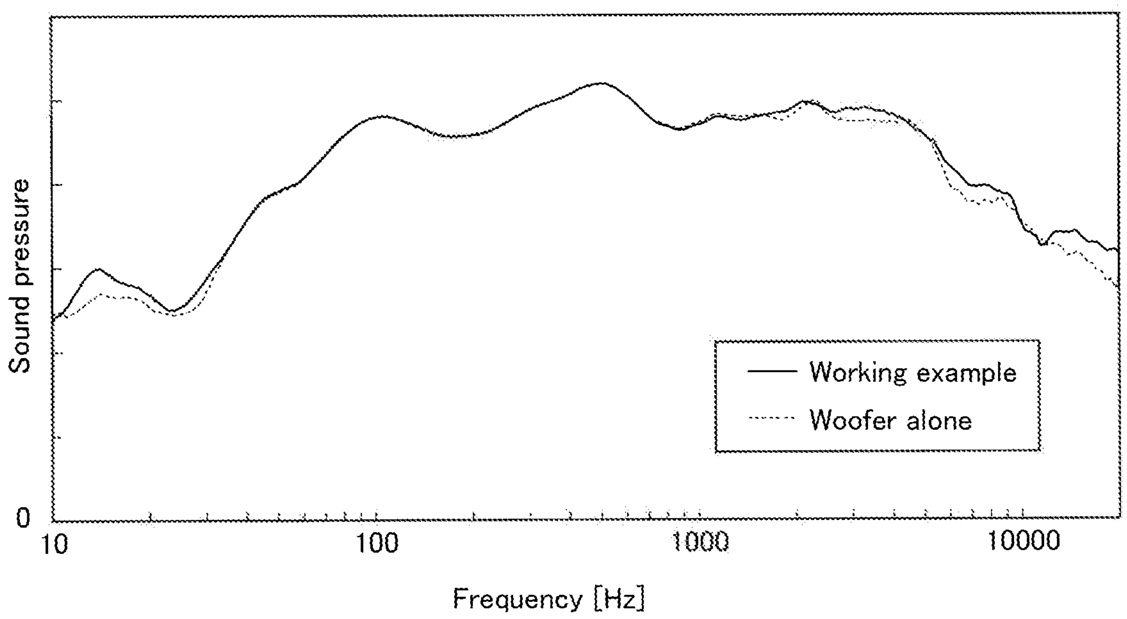
FIG. 4 is a graph showing frequency characteristics of a woofer included in the coaxial speaker.

FIG. 4 is a graph showing a result of comparing the frequency characteristics of the woofer 2 in the state of being incorporated in the coaxial speaker 1 of the present embodiment as a working example, with the frequency characteristics of the woofer 2 alone (in the state where the tweeter 3 and the horn 4 are removed from the coaxial speaker 1 of the present embodiment).

The same woofer 2 was used in both the "working example" and in the "woofer alone" example. In the "working example", the total opening area of the plurality of through holes 41 as viewed in the axial direction of the horn 4 is 37% of the entire area of the horn 4. Each through hole 41 is formed in a circular shape as viewed in the axial direction of the horn 4. The opening area of the through holes 41 located on the radially inner side is smaller than the opening area of the through holes 41 located on the radially outer side. The diameter dimension of each through hole 41 is set in a range of 2.5 mm to 7.5 mm in increments of 0.5 mm.

As shown in the graph of FIG. 4, it was confirmed that the frequency characteristics of the "working example" approximate to those of the "woofer alone" example. That is to say, it has been confirmed that, in the horn 4 (coaxial speaker horn) and the coaxial speaker 1 of the present embodiment, the frequency characteristics of the woofer 2 incorporated in the coaxial speaker 1 can be effectively suppressed from changing from the frequency characteristics of the woofer 2 alone.

The present disclosure has been described in detail above; however, the present disclosure is not limited to the above embodiments, and various modifications may be made without departing from the scope of the present disclosure.

In the present disclosure, the upper limit value of the opening area of each through hole 41 may be, for example, $(\lambda/4)^2$ or less, where $\lambda$ is the wavelength of the sound corresponding to an upper limit frequency among the sound that is output from the tweeter 3 and the sound pressure of which is increased by the horn 4. The upper limit frequency may be, for example, an upper limit of the sound frequency that is set according to the specifications required of the coaxial speaker 1. By also setting the upper limit value of the opening area of each through hole 41 in this manner, it is possible to effectively suppress the above "function of the horn 4" from becoming impaired.

In the present disclosure, the individual opening areas of all the through holes 41 formed in the horn 4 may be equal to each other, for example.

In the present disclosure, the shapes of the woofer 2, the tweeter 3, and the horn 4 as viewed from the front side (in the axial direction) are not limited to circular shapes, and may be elliptical shapes, for example.

What is claimed is:

1. A coaxial speaker horn for constituting a coaxial speaker together with a tweeter and a woofer, comprising:
- a plurality of through holes arranged an entire circumference of the horn,
- wherein the plurality of through holes are arranged in radial directions of the horn when viewed from an axial direction of the horn, and
- wherein the plurality of through holes comprise a through hole located on a radially inner side and a through hole located on a radially outer side, and an opening area of the through hole located on the radially inner side is smaller than an opening area of the through hole located on the radially outer side.

2. The coaxial speaker horn according to claim 1, wherein a total opening area of the plurality of through holes when viewed in the axial direction of the horn is 35% or more of an entire area of the horn when viewed in the axial direction.

3. The coaxial speaker horn according to claim 1, wherein an upper limit value of an opening area of each of the plurality of through holes is set so that the horn maintains a function thereof to increase a sound pressure of a sound at a predetermined frequency output from the tweeter.

4. The coaxial speaker horn according to claim 1, wherein a total opening area of the plurality of through holes when viewed in the axial direction of the horn is 60% or less of an entire area of the horn when viewed in the axial direction.

5. The coaxial speaker horn according to claim 1, wherein the plurality of through holes are provided only in a region overlapping with the woofer when viewed from the axial direction of the horn.

6. A coaxial speaker comprising:
- a horn comprising a plurality of through holes arranged around an entire circumference of the horn;
- a tweeter attached to a central portion of the horn when viewed from an axial direction of the horn; and
- a woofer arranged coaxially with the tweeter, the woofer being arranged on a rear side of the tweeter, wherein
  - the plurality of through holes are arranged in radial directions of the horn when viewed from an axial direction of the horn, and
  - the plurality of through holes comprise a through hole located on a radially inner side and a through hole located on a radially outer side, and an opening area of the through hole located on the radially inner side is smaller than an opening area of the through hole located on the radially outer side.

* * * * *